(12) United States Patent
Da Silva et al.

(10) Patent No.: US 12,570,891 B2
(45) Date of Patent: Mar. 10, 2026

(54) USE OF MICROCAPSULES CONTAINING ACIDS IN ITS INTERIOR AND METHOD OF TREATMENT USING A SCALE INHIBITOR ACTIVATED BY SAID MICROCAPSULES

(71) Applicant: PETRÓLEO BRASILEIRO S.A.-PETROBRAS, Rio de Janeiro (BR)

(72) Inventors: Mario Germino Ferreira Da Silva, Rio de Janeiro (BR); Valtair Marco Cristante, Rio de Janeiro (BR); Fernando Antonio Moreira Da Silva, Rio de Janeiro (BR)

(73) Assignee: PETRÓLEO BRASILEIRO S.A.-PETROBRAS, Rio de Janeiro (BR)

( * ) Notice: Subject to any disclaimer, the term of this patent is extended or adjusted under 35 U.S.C. 154(b) by 157 days.

(21) Appl. No.: 18/397,499

(22) Filed: Dec. 27, 2023

(65) Prior Publication Data

US 2024/0218235 A1     Jul. 4, 2024

(51) Int. Cl.
E21B 37/06     (2006.01)
C09K 8/528     (2006.01)

(52) U.S. Cl.
CPC .............. C09K 8/528 (2013.01); E21B 37/06 (2013.01)

(58) Field of Classification Search
CPC ................................ C09K 8/528; E21B 37/06

(Continued)

(56) References Cited

U.S. PATENT DOCUMENTS 4,787,455 A * 11/1988 Snavely, Jr. ........... C09K 8/528
                                                              507/224
7,950,462 B2 * 5/2011 Xiao ........................ C09K 8/74
                                                              166/311

(Continued)

FOREIGN PATENT DOCUMENTS

BR           9902995 A      5/2000
BR      112017023159 B1    9/2022

OTHER PUBLICATIONS

Al-Thuwaini et al., Encapsulated Scale Inhibitor Treatment. SPE 37790, Society of Petroleum Engineers Inc. pp. 295-299, (1997).

(Continued)

*Primary Examiner* — William D Hutton, Jr.
*Assistant Examiner* — Ashish K Varma
(74) *Attorney, Agent, or Firm* — McCarter & English, LLP; Wei Song

(57)          ABSTRACT

The present invention proposes the use of microcapsules containing acids in its interior to adjust the pH of the scale inhibitor in oil reservoirs. The microcapsules are comprised of an inner moiety with organic or inorganic acid and an outer moiety comprised of an oil-soluble polymeric material at the reservoir temperature. The microcapsules open due to the effect of the reservoir temperature, releasing the acid into the corrosion inhibitor, hence changing its pH. The present invention further proposes a method of treatment using scale inhibitors using microcapsules containing acids in its interior to adjust the pH of the scale inhibitor in oil reservoirs, wherein the method comprises the steps of (a) preparing the scale inhibitor product; (b) pumping the inhibitor solution prepared into the standpipe manifold; (c) adding the acidic microcapsules to the scale inhibitor; and (d) injecting the inhibitor solution mixture containing the acidic microcapsules into the production well column.

17 Claims, 3 Drawing Sheets

(58) Field of Classification Search
USPC ........................................................ 166/304
See application file for complete search history.

(56) References Cited

U.S. PATENT DOCUMENTS

| 10,436,693 | B2 * | 10/2019 | Dwarakanath | .......... | E21B 43/16 |
| 2003/0150613 | A1 * | 8/2003 | Freiter | .................. | C09K 8/528 |
| | | | | | 507/260 |
| 2022/0081606 | A1 * | 3/2022 | Howe | .................... | C09K 8/528 |

OTHER PUBLICATIONS

Bourne et al., Effective Treatment of Subsea Wells with a Solid Scale Inhibitor System. SPE 60207, Society of Petroleum Engineers Inc. pp. 1-9, (2000).

Johnson et al., Core/Shell Systems for Delayed Delivery of Concentrated Mineral Acid. SPE International Symposium on Oilfield Chemistry. 173734, 11 pages, (2016).

Rebeschini, Avaliacao de Aditivos Quimicos para Dissolver Incrustacao Inorganica de Sulfato de Bario em Pocos de Petroleo. Universidade Estadual de Campinas Faculdade de Engenharia Mecanica e Instituto de Geociencias Comissao de Programa Multidisciplinar de Pos-Graduacao em Ciencias e Engenharia de Petroleo. 136 pages, Jul. 7, 2010.

* cited by examiner

Sea surface temperature in degrees Celsius (°C)

North
Atlantic

South
Atlantic

Campos basin

Approximate average water temperature at various depths

USE OF MICROCAPSULES CONTAINING ACIDS IN ITS INTERIOR AND METHOD OF TREATMENT USING A SCALE INHIBITOR ACTIVATED BY SAID MICROCAPSULES

RELATED APPLICATIONS

This application claims the benefit of priority to Brazilian Patent Application No. 1020220269009, filed Dec. 28, 2022, the entire contents of which are incorporated herein by reference.

FIELD OF THE INVENTION

The present invention is within the technical field of modeling, simulation and evaluation of reservoirs, more specifically in scale management and in the increase and improvement of the production flow.

The present invention describes a method for adjusting the pH of the scale inhibitor in oil reservoirs using microcapsules containing acids in its interior to adjust the pH of the scale inhibitor.

BACKGROUND OF THE INVENTION

Scaling is an intrinsic problem in oil reservoir exploration worldwide. Over the years and the technological advancements in research in the oil and gas industry, this obstacle to production has increasingly attracted the attention of companies on how to mitigate both its risk and its impact.

Scaling is nothing but inorganic components present in water which, when precipitated, form, in most cases, solid substances that are difficult to remove (Kelland, 2009). It is important to emphasize that not only reservoirs or pipelines are prone to the appearance of scaling, but the entire oil separation structure on platforms, from separators to storage tanks.

For a system to be prone to fouling, it is sufficient for it to have dissociated ions in the produced water and for some form of disturbance to occur, disrupting its balance and leading to precipitation (Kelland, 2009). The main cations that cause scaling are Calcium ($Ca^{+2}$), Magnesium ($Mg^{+2}$), Barium ($Ba^{+2}$), Strontium ($Sr^{+2}$) and Iron and the anions are Bicarbonate ($HCO_3^-$), Carbonate ($CO_3^{-2}$), Sulfate ($SO_4^{-2}$), Sulfide ($S^{-2}$) and oxides in general. Cations and anions that attract the most attention in Brazilian fields are barium sulfate ($BaSO_4$) and calcium carbonate ($CaCO_3$).

To avoid the appearance of scaling, it is therefore imperative to prevent sulfate anions from reaching the reservoir. To this end, Sulfate Removal Units (SRU) are available, which are part of the platforms' injection water treatment system. However, not all platforms have SRUs due to space and design issues.

Over the years, some technologies with the aim of preventing chemical reactions that lead to the formation and growth of scale grains have emerged, with emphasis on scale inhibitors. This technology consists of chemicals with different applications on precipitated crystals. Some scale inhibitors are based on stopping nucleation of new crystals and others on blocking their growth by modifying the existing structure. "Scale squeeze" is a technique that is based on this last concept and its main objective is to protect the reservoir from the possible occurrence of scaling. In this treatment, chemical agents designated as scale inhibitors are injected into the formation, immediately after acid stimulation.

However, before carrying out the "scale squeeze" treatment, studies are carried out on the chemical composition of the scales and the properties of the formation rocks and fluids present therein to determine which type of inhibitor should be applied in each case. These studies are required because there exist several types of inhibitors, each having a specific application.

Activities related to "scale squeeze" operations in an oil reservoirs were also carried out by pumping and injecting scale-inhibiting chemicals into the reservoir. However, to prevent damage to equipment in the subsea production system, such as: production column, Christmas tree, production lines, production riser, and so on., these chemicals should have a pH limited to the minimum value of pH 4.0 as to not cause corrosion in the production system equipment.

Laboratory tests demonstrate that in acidic pH solutions with pHs below 4.0, for example, about 2.0, some inhibitors are much more efficient as inhibitors; however such pH range has the disadvantage of causing corrosion in the production system equipment.

That being said, the technical problem that motivated the invention was the need to control the pH, that is, the acidity of the chemical treatment solutions to be injected into production wells or injectors to chemically treat the reservoir, also taking into account the pH range that increases efficiency of these inhibitors within the reservoir.

Chemical treatment solutions for pre-salt carbonate reservoirs usually consist of 15% hydrochloric acid, 10% acetic acid and formic acid. pH of these solutions usually causes problems in the metallurgy of the production system, where it will pass while being pumped to the reservoir, creating corrosion issues in the metallurgy used in the production system.

To solve this problem, the present invention proposes to adjust the pH of the scale inhibitor in oil reservoirs, hence avoiding scaling and reducing corrosion to equipment, through a method of treatment and the use of microcapsules containing acids in its interior so as to provide a better efficiency of the scale inhibitor.

Many studies in the field of scaling management and improvement of production flow have been carried out and have been addressed in patent documents that are part of the state of the art.

NON-PATENT DOCUMENT—ENCAPSULATED SCALE INHIBITOR TREATMENT by JS Al-Thuwaini et al (1997) discloses one of the first treatment projects developed with an encapsulated scale inhibitor in oil wells. The paper also makes a comparison between the type of release of the inhibitor via the traditional procedure and via encapsulated treatment, highlighting some advantages and conclusions.

Although the paper does not clearly define the scale inhibitor composition and shows the possibility of encapsulation, the main difference of this paper from the subject matter of the present invention is that in the paper the scale inhibitor is what is being encapsulated and released into the medium while in the present invention, the acid is encapsulated and dissolved in the scale inhibitor, thus altering the medium pH.

Therefore, despite a correlation exists between the subject matters of both documents, the technologies covered thereby are different.

Patent document PI 9902995-2 by Champion Technologies, Inc., refers to compositions comprising oil-soluble scale inhibitors in acidic form at a pH of less than 2.5 and their use in inhibiting scaling in hydrocarbon production systems, such as oil fields.

More specifically, such document relates to compositions comprising an acidic form of a scale inhibitor and a tertiary alkyl primary amine.

Suitable scale inhibitors for use in accordance with the invention include phosphonates, acrylic co-tert-polymers, polyacrylic acid (PAA), phosphinocarboxylic acid (PPCA), phosphate esters, or other traditional water-based scale inhibitors.

The composition is formed by mixing scale inhibitors in acidic form with a tertiary alkyl primary amine. The composition is dissolved in the hydrocarbon fluid or an organic solvent.

The document cites some organic acids present in scale inhibitors and shows that the scale inhibitor in acidic form has advantages over conventional compositions used to inhibit scale formation but does not address any encapsulation.

Such document has significant differences over the present invention, as in this case pH adjustment is made through the direct use of a product with an acidic pH in the medium rather than the addition of acidic microcapsules to the scale inhibitor.

NON-PATENT DOCUMENT —EFFECTIVE TREATMENT OF SUBSEA WELLS WITH A SOLID SCALE INHIBITOR SYSTEM by H M Bourne et al (2000) discloses an alternative treatment strategy that can be implemented from a DSV (diving support vessel), minimizing intervention time and costs with treatment.

The well treatment system addressed therein relies on the injection of a microencapsulated scale inhibitor product that consists of a thickening agent and an active scale inhibitor surrounded by a permeable protective polymeric membrane (FIG. 5). This technology has been used in plant facilities and low-pressure or water-sensitive wells because of its minimal pumping requirements, low deployment volumes, and negligible risk of treatment intrusion into the reservoir.

The encapsulated scale inhibitor product consists of particles of approximately 25 to 75 μm in diameter, however, they tended to agglomerate forming a larger capsule of 1-3 mm in size. A weighting agent was added to encourage the capsule to sink rapidly toward the rat hole in order to minimize downtime in the wellbore. The permeable polymer membrane that encapsulates the inhibitor and thickening agent is designed to stimulate the stepwise release of the inhibitor over an extended production period, thereby minimizing the treatment volume required for effective scaling control. This in turn was designed to reduce the impact of treating the wellbore hydrodynamics. The inhibitor was selected based on its known scale inhibition characteristics under moderate scaling conditions.

Similarly to NON-PATENT DOCUMENT ENCAPSULATED SCALE INHIBITOR TREATMENT (1997), the paper does not clearly define the composition of the scale inhibitor product but mentions encapsulation. The main difference between this paper and the subject matter of the present invention is that in the paper the scale inhibitor product (scale inhibitor+thickening agent) is encapsulated, which is released into the medium, while in the present invention it is the acid that is encapsulated and dissolved in the scale inhibitor, hence changing the medium pH.

Therefore, despite a correlation exists between the subject matters of both documents, the technologies covered thereby are also different.

NON-PATENT DOCUMENT—CORE/SHELL SYSTEMS FOR DELAYED DELIVERY OF CONCENTRATED MINERAL ACID by Leah M. Johnson et al (2016) addresses the use of encapsulated HCl with a prolonged release profile to allow transportation of acid in the depths of the reservoir. Furthermore, when successfully encapsulated, this technology can eliminate, or at least minimize, the use of corrosion inhibitors.

The document shows the design and preparation of highly modular (core/shell) particles comprising concentrated HCl encapsulated within an acrylate-based thermosetting polymer shell. The document shows that the shell generation mechanism (photopolymerization of acrylate monomers) is compatible with concentrated HCl and also provides details on the encapsulation process. The document further shows the results achieved and demonstrates that the acidic release profiles are dictated by the properties of the shell material, allowing a prolonged Hcl release.

The paper discloses a first step of designing particle enclosure systems that can tolerate adverse reservoir conditions, including high temperatures, pressures, and mixing water salinity. An adjustable core/shell delivery system that encompasses a sufficient amount of strong mineral acid is well positioned to address the unmet need for deeper penetration of HCl into the reservoir, allowing greater efficiency of stimulation.

The document mentions capsules in which the core is formed by an acid, however the purpose of use is different. The aforementioned document is intended to address the issue of stimulating carbonate rocks, that is, "deeper penetration of HCl into the reservoir, allowing greater efficiency of stimulation". Thus, the technology described the this document is related to the field of stimulation in completion operations, which takes place during construction of the wellbore, whereas the technology taught in the present invention is aimed at the field of scaling management aiming to adjust the pH of the inhibitor within the reservoir, thus preserving the subsea production system equipment during the useful life of the wellbore in the management of production and also avoiding the need to use corrosion inhibitors.

THE ACADEMIC MASTER'S DISSERTATION "AVALIAçÃO DE ADITIVOS QUÍMICOS PARA DISSOLVER INCRUSTAçÃO INORGÂNICA DE SULFATO DE BARIO EM POCOS DE PETRÓLEO", by Jordani Rebeschini (2010) discloses laboratory tests aimed at assessing the performance of chemical additives, mainly diesters, as chemical additives capable of dissolving inorganic scales of barium sulfate at a pH close to 7, by carrying out comparative tests with the DTPA salt (pentasodium DTPA) and providing comments on the performance and application thereof. Strategies for removing inorganic scales in the vicinity of an oil producing wellbore are assessed with the aid of numerical simulation of flows.

The document discloses that there are three generic types of scale inhibitors: ester-phosphate, phosphonates (ATMP, DTPMPA, HEDP, EDTMPA, and so on) and acidic polymers (PAA, PMA, PPCA, PVS).

Some of them are mentioned in the present invention and are used as acids in the microcapsules.

The master's dissertation only addresses the possibility of encapsulating the scale inhibitor, but not the acid as does the present invention.

DOCUMENT BR 112017023159-0 describes in a very generic manner compositions and articles having numerous applications in the field of treatment of oil wellbores, including as scale inhibitors. The compositions comprise:

(a) a core and (b) a shell covering at least part of the core, wherein the core comprises a mixture of at least one oil field chemical product and at least one core matrix, and the composition provides a controlled release of the oil field chemical product into an eluent.

The compositions and articles described in the document can be used in monitoring/tracking a fluid flow from a hydrocarbon reservoir.

The document only mentions several possible compositions for several different applications but does not specify any application of the scale inhibitor.

Thus, it is evident that the documents cited and commented on above do not use, describe or benefit from the possible technical advantages of using acidic microcapsules to adjust the pH of the scale inhibitor in oil reservoirs, as described in the present invention. Therefore, the state of the art does not provide a method and the use of acidic microcapsules to adjust the pH of the scale inhibitor in oil reservoirs, as detailed below.

SUMMARY OF THE INVENTION

The present invention proposes the use of microcapsules containing acids in its interior to adjust the pH of the scale inhibitor in oil reservoirs.

The microcapsules are comprised of an inner moiety with organic or inorganic acid and an outer moiety comprised of an oil-soluble polymeric material at the reservoir temperature. The microcapsules open due to the effect of the reservoir temperature, releasing the acid into the corrosion inhibitor, hence changing its pH.

The present invention further proposes a method of treatment using scale inhibitors using microcapsules containing acids in its interior to adjust the pH of the scale inhibitor in oil reservoirs, wherein the method comprises the steps of (a) preparing the scale inhibitor product; (b) pumping the inhibitor solution prepared into the standpipe manifold; (c) adding the acidic microcapsules to the scale inhibitor; and (d) injecting the inhibitor solution mixture containing the acidic microcapsules into the production well column.

DETAILED DESCRIPTION OF THE INVENTION

Figure 1:
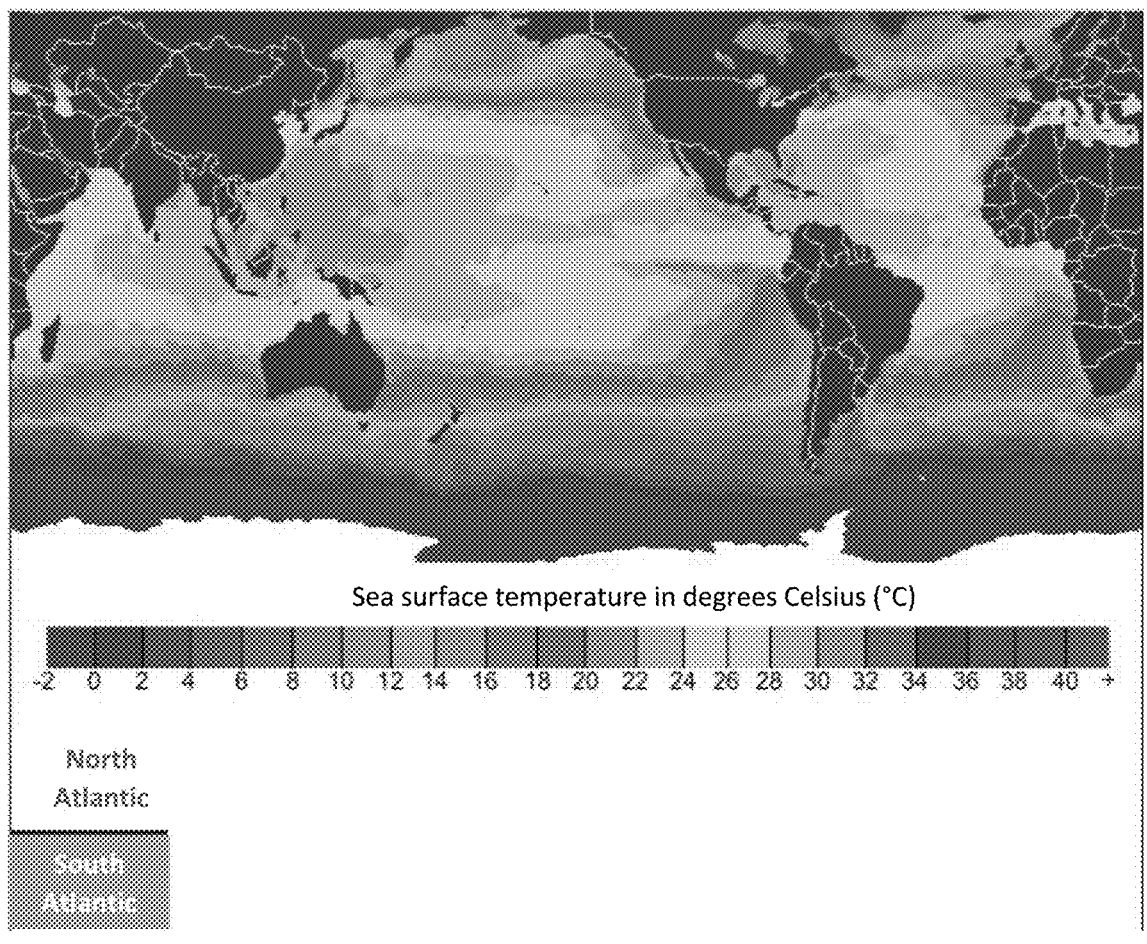
FIG. 1 shows sea surface temperatures in the oceans in degrees Celsius (° W).

The present invention solves the problem described in the state of the art by using acid-containing microcapsules to adjust the pH of the scale inhibitor from the range between 4 and 5 to a value of 1.5 to 2.0, which will take place within of the reservoir.

The microcapsules are comprised of an inner moiety with organic or inorganic acid and an outer moiety comprised of an oil-soluble polymeric material at the reservoir temperature and pressure. The microcapsules open due to the effect of the reservoir temperature and/or pressure, releasing the acid from its interior into the scale inhibitor, hence changing its pH.

The preferred organic acids to be used inside the microcapsules are polyacrylic acid (PAA), phosphinocarboxylic acid (PPCA), polyvinylsulfonate (PVS), polymaleic acid (PMA), diethylenetriaminepenta phosphonate (DETPPMP), bishexamethylenetriamine pentabismethylene phosphonate (BIS HMTPMP) and citric acid. The preferred inorganic acid is hydrochloric acid (HCl). The exact amount of acid inside the microcapsule will depend on the size of the microcapsules.

The coating of the acidic microcapsules are made of polymeric material, that is, special polymers that remain intact under cold conditions, that is, they do not degrade under these conditions, but upon being placed at the temperature and pressure of the reservoir they will degrade to release the acid from its interior. Usually the polymer used is Poly-N-isopropylacrylamide (PNIPAm).

Displacement of the acidic microcapsules will be carried out using a scale-inhibiting fluid, that is, the acidic microcapsules will be placed downstream of the pumping unit, inside the scale-inhibiting fluid that will be placed inside the pumping line, and then this mixture of microcapsules with the scale inhibitor fluid will be carried into the wellbore.

No carrier solvent is used. In fact, the microcapsules will be pumped together with the scale inhibitor during the inhibitor squeeze operation in the reservoir.

The microcapsules will be pumped together with the scale inhibitor solution, which will be an organic solution (scale inhibitor) mixed with a saline aqueous fluid that is chemically compatible with the microcapsule material.

The product used as a scale inhibitor is a formulation obtained from a mixture of salts and phosphonic acids $(R_1—P(OR_2)(OR_3))$, sulfonic acids $(R—SO_3H)$ and/or carboxylic acids $(R—COOH)$.

Concentration of the acidic microcapsules and the volume of scale inhibitor fluid will be determined depending on the well completion design, the net pay of the producing intervals for open-hole well completion, the perforated extension of the interval for cased-hole well completion, wherein the total volume of scale inhibiting fluid will be defined as a function of the time estimated for the squeeze treatment in the reservoir, i.e. the time taken by the treatment is directly proportional to the volume of scale-inhibiting fluid pumped. The concentration of acidic microcapsules in the inhibitor is estimated to be from 1 to 5% of the average volume of 600 bbl of scale inhibitor per run.

The present invention also proposes a method of treatment with scale inhibitor activated by acidic microcapsules containing acids in its interior, wherein the method comprises the steps of (a) preparing the scale inhibitor product In a feed tank (1), the scale inhibitor is diluted in industrial or desulfated water to a concentration of 10% inhibitor in water, that is, in a volume of 100 $m^3$ of water 10 $m^3$ of inhibitor is used. The fluid supply tank (1) will have two functions, the first of preparing the inhibitor solution and the second of storing the inhibitor fluid thus prepared.

(b) Pumping with the aid of the probe pump (2), the inhibitor solution prepared in the supply tank (1) into the standpipe manifold (3). At the standpipe manifold (3) the scale inhibitor fluid will be aligned passing through the lock valve (4) to the position of the tank of acidic microcapsules (5).

(c) Adding the acidic microcapsules by gravity at a concentration of 1% of the average volume of 600 barrels of scale inhibitor at a low flow rate of 0.5 bpm (0.5 barrel per minute).

Figure 5:
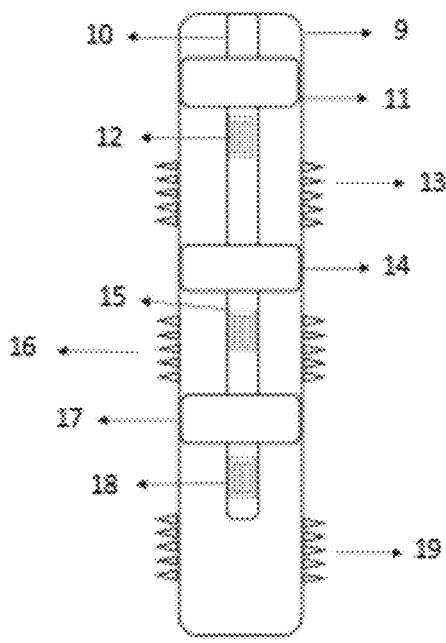
FIG. 5 is a detailed schematic of the wellbore shown in FIG. 4.

(d) In the injection head (6), injecting the inhibitor solution mixture containing the acidic microcapsules by passing through the rotary table (7) into the producing well column (10), as shown in FIG. 5.

The inhibitor solution mixture containing the acidic microcapsules will be injected into each of the intervals of the producing well, and then respectively into each reservoir interval, through the ICVs (inflow control valves) of the upper (12), intermediate and (15) and lower (18) intervals as shown in FIG. 5.

FIG. 5 depicts in greater detail the completion scheme of a well with three producing intervals in sequence: the casing (9), production column (10), upper interval packer (11), upper interval ICV valve (12), upper interval perforation (13), intermediate packer (14), intermediate interval ICV valve (15), intermediate interval perforation (16), lower interval packer (17), lower interval ICV valve (18) and lower interval perforation (19).

Injection of the acidic microcapsules into the reservoir is accompanied by an injection pressure of 200 psi versus the scale inhibitor pumping flow rate suggested for the microcapsules of 5 bpm, in order to achieve the best effect of the action of the acidic microcapsules during injection of the inhibitor into the reservoir.

The invention can also be applied in scale inhibitor squeeze operations in the reservoir, remote pre-inhibition operations carried out by WSSV boats, autonomous pre-inhibition operations carried out by a stationary production unit (SPU), remote operations carried out by light workover probes in oil wellbores. Accordingly, the present invention has potential application in the fields of reservoirs, more specifically in the management of reservoirs by managing scaling and in the elevation and flow to guarantee production flow. This is done by increasing the efficiency of scale inhibitor squeeze operations in the reservoir.

Therefore, the treatment method can be carried out at three different temperatures, the first possible temperature is room temperature of around 25° C., i.e., on the WSSV boat connected to the stationary production unit (SPU) during the pumping and displacement of the scale inhibitor fluid mixture with the acidic microcapsules.

Figure 2:
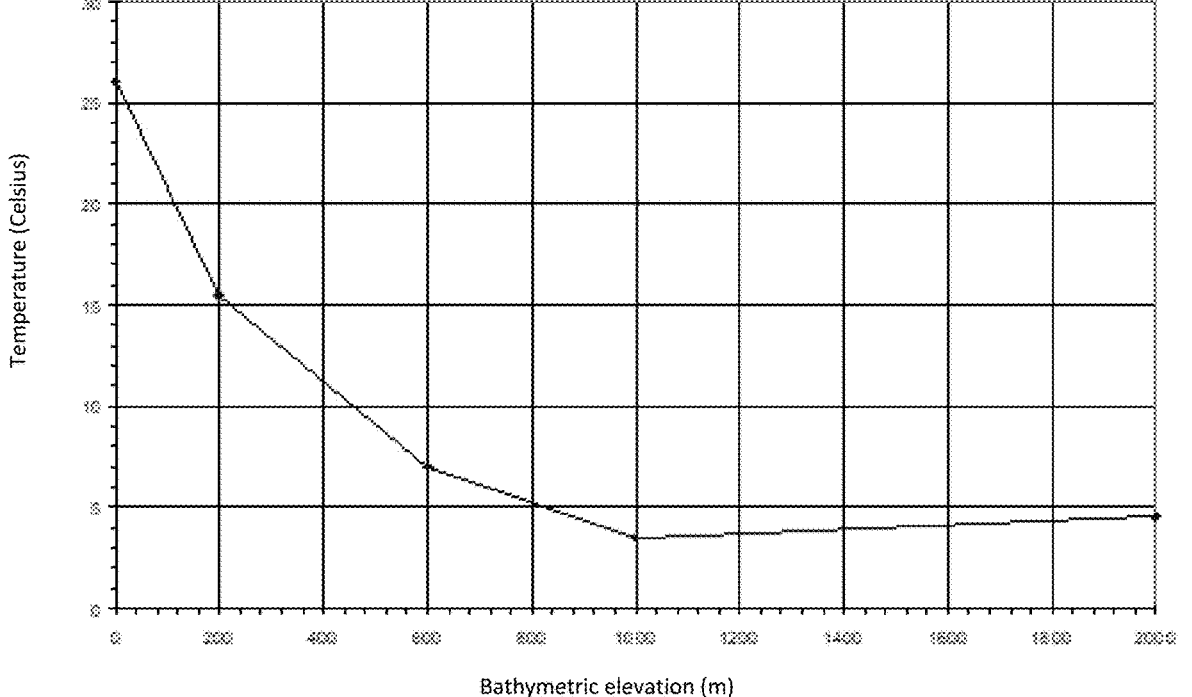
FIG. 2 is a graph of the average water temperature (° C.) at various depths versus the bathymetric elevation (m) in the Campos Basin, in Brazil.
Figure 3:
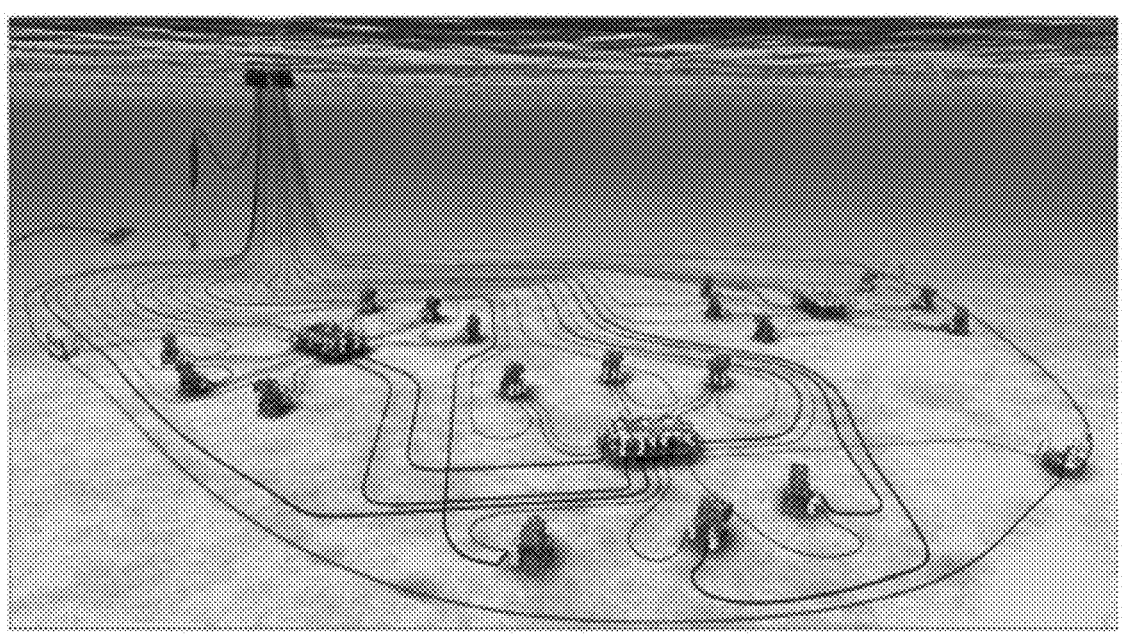
FIG. 3 represents a subsea production system.
Figure 4:
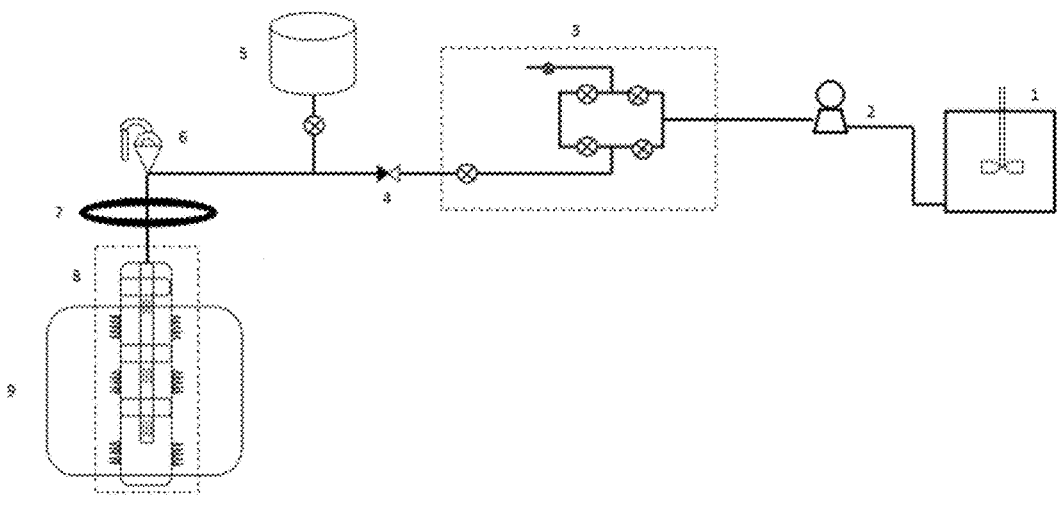
FIG. 4 is a schematic using probe tanks of the method proposed in the present invention.

The second temperature is in a range that includes the sea surface (between 22° C. and 24° C.). ° C.) and the temperature of the seabed, which is around 4° C. (as shown in FIGS. 1, 2 and 3), where the mixture of inhibitor fluid with the acidic microcapsules will pass through a length of 6 to 8 kilometers at this temperature. The effect of the seabed temperature causes a heat exchange that cools the pumped fluids, which, depending on the distance between the SPU and the wellbore Christmas tree, arrive at the Christmas tree at temperatures of about 4° C., as shown in FIG. 3.

The third temperature will be that of the reservoir, which ranges around 88 to 100° C., but when the pumped fluids enter the Christmas tree and descend through the production column until being injected into the reservoir, from this moment onwards, geothermal heating begins where the fluid placed inside the reservoir will be heated until it enters in thermal equilibrium with the reservoir, being at the same temperature as the reservoir, that is, geothermal heating of the squeeze solution will be carried out by the reservoir itself at around 88 and 100° C.

Due to these three temperatures, the microcapsule needs to have a decomposition temperature in the range of from 80 to 100° C. The capsule decomposition temperature needs to be greater than room temperature because on the platform the temperature will be of about 25° C. and at the bottom of the seabed it will be 4° ° C., however, inside the well the temperature can range from 88° C. to 100° C., then the optimal decomposition temperature of the capsule will be of about 80 to 100° C.

The use of soluble acidic microcapsules in the scale inhibitor brings direct advantages since the scale inhibitor product can be pumped in a pH range that does not bring corrosion issues in the production system since the use of acidic microcapsules will allow adjustment of the pH in the reservoir.

A second advantage would be the increased exposure of the inhibitor to the rock, which could increase the adsorption efficiency and the volume of treated rock (if a decomposition time greater than the treatment pumping time is achieved).

Thus, both the method and the use provide an increased useful life of the production system and top-side equipment while increasing the useful life of the reservoir inhibition, thus avoiding production losses associated with the formation of scales in the production system, contributing to management of the production by maintaining well production.

Regarding the environment, this application also brings advantages as it reduces $CO_2$ emissions due to the reduced need to use a WSSV type vessel to carry out scale removal and inhibitor squeeze operations.

Tests and Results with the Scale Inhibitor:

Initial tests were carried out, including: static compatibility test, flow test in a capillary, flow test in porous media.

The static compatibility test is carried out to assess the chemical compatibility of the inhibitor with the reservoir formation water. The test result is considered compatible when the mixture does not become cloudy or forms precipitates. If turbidity and/or precipitation is found, the test is deemed incompatible.

The capillary flow test is carried out to determine the minimum inhibitor concentration that must be used to ensure effectiveness of the inhibition process. The test result is deemed compatible when there is no precipitation of the inhibitor inside the capillary (restricted flow funneling) under flow conditions as a function of the time during the test.

The flow test in porous media is carried out to verify that there is no damage (flow blockage) to the reservoir rock and to obtain the adsorption isotherm that will be used for sizing. The result will be used to size the volumes that will be applied in the treatment. Obtaining the absorption isotherm is essential to obtain the time length of the treatment (useful life of the scale inhibition treatment).

The results are presented in the table below:

| Test type | Result obtained | Note: |
|---|---|---|
| Static compatibility test | Scale inhibitor and formation water are compatible | There was no precipitation or turbidity in the water when compared to the blank test (with formation water only) |
| Capillary flow test | There is no precipitation of inhibitor under flow conditions as a function of time | Determination of the minimum inhibitor concentration that must be used to ensure |

-continued

| Test type | Result obtained | Note: |
|---|---|---|
| Flow test in porous media | Test with the reservoir rock plug to obtain the adsorption isotherm to be used to size the volumes that will be applied in the treatment | effectiveness of the process Obtaining the absorption isotherm is essential to obtain the treatment length of time. |

Results of the Static Compatibility Test, Capillary Flow Test and Porous Media Flow Test demonstrated that the tested inhibitor is qualified for application in the field, as it was effective in preventing scaling in the reservoir. Therefore, this inhibitor has been approved for use with acidic microcapsules, which will allow adjustment of the pH within the reservoir. Such pH control will reduce corrosion of equipment in the subsea production system.

The invention claimed is:

1. A method of treatment with a scale inhibitor activated by acid-containing microcapsules containing acids in an interior of the acid-containing microcapsules, the method comprising the steps of:

(a) preparing a scale inhibitor solution;

(b) pumping with a probe pump, the scale inhibitor solution into a standpipe manifold;

(c) adding acid-containing microcapsules to the scale inhibitor solution to obtain a scale inhibitor solution containing the acid-containing microcapsules; wherein the acid-containing microcapsules comprise an inner moiety with one or more organic or inorganic acids and an outer moiety comprising a polymeric material that is soluble in oil at a temperature and pressure of a reservoir; and (d) injecting the scale inhibitor solution containing the acid-containing microcapsules into a producing well column.

2. The method, according to claim 1, wherein in step (a) the scale inhibitor is diluted in industrial or desulfated water to a concentration of 10% scale inhibitor in water.

3. The method, according to claim 1, wherein the scale inhibitor solution is prepared in a supply tank, and the supply tank has a first and a second function, the first function is preparing the scale inhibitor and the second function is storing the scale inhibitor.

4. The method, according to claim 1, wherein the scale inhibitor containing the acid-containing microcapsules is injected into each producing interval of the producing well column into each respective reservoir interval, through inflow control valves (ICV) valves of an upper, intermediate and lower intervals.

5. The method, according to claim 1, wherein injection of the microcapsules into a reservoir is accompanied by an injection pressure of 200 psi versus a pumping flow of 5 bpm.

6. The method, according to claim 1, wherein the pH of the scale inhibitor solution containing the acid-containing microcapsules is adjusted from a range between 4 and 5 to between 1.5 and 2.0, inside a reservoir.

7. The method, according to claim 6, wherein no carrier solvent is used with the scale inhibitor.

8. The method, according to claim 6, wherein the scale inhibitor is a formulation obtained from a mixture of salts and phosphonic acids ($R_1$—$P(OR_2)(OR_3)$), sulfonic acids ($R$—$SO_3H$) and/or carboxylic acids ($R$—$COOH$).

9. The method, according to claim 6, wherein the acid-containing microcapsules have a decomposition temperature of 80 to 100° C.

10. The method, according to claim 6, wherein a concentration of acid-containing microcapsules in an average volume of 600 bbl of scale inhibitor solution is 1 to 5%.

11. The method, according to claim 6, wherein the acid-containing microcapsules are used and applied in scale inhibitor squeeze operations in the reservoir, remote pre-inhibition operations carried out by Well Simulation Support Vessel (WSSV) boats, autonomous pre-inhibition operations carried out by a stationary production unit (SPU), and remote operations carried out by light workover probes in oil wellbores.

12. The method, according to claim 1, wherein the organic acids in the inner moiety of the acid-containing microcapsule are polyacrylic acid (PAA), phosphinocarboxylic acid (PPCA), polyvinylsulfonate (PVS), polymaleic acid (PMA), diethylenetriaminepenta phosphonate (DETPPMP), bishexamethylenetriaminepentabismethylene phosphonate (BIS HMTPMP) or citric acid.

13. The method, according to claim 1, wherein the inorganic acid of the inner moiety of the acid-containing microcapsule is hydrochloric acid (HCl).

14. The method, according to claim 1, wherein the polymeric material of the outer moiety of the acid-containing microcapsule comprises polymer that remain intact when cold, but when at the temperature and pressure of the reservoir, the polymer degrades, releasing the acid from the inner moiety.

15. The method, according to claim 14, wherein the polymer is Poly-N-isopropylacrylamide (PNIPAm).

16. The method, according to claim 1, wherein the acid-containing microcapsules are added by gravity, at a concentration of 1%, to the scale inhibitor at a low flow rate of 0.5 bpm (0.5 barrel per minute).

17. The method, according to claim 1, wherein the scale inhibitor solution containing the acid-containing microcapsules is injected in an injection head by passing through a rotary table into a producing well column.

* * * * *